Aug. 15, 1944.  J. E. SIMON, NÉE GRÜNEBAUM  2,355,913
CONNECTING DEVICE
Filed May 13, 1940

INVENTOR
JOHANNA ELLY SIMON,
NÉE GRÜNEBAUM

BY Young, Emery & Thompson
ATTYS.

Patented Aug. 15, 1944

2,355,913

UNITED STATES PATENT OFFICE 2,355,913

CONNECTING DEVICE

Johanna Elly Simon, nee Grünebaum,
London, England

Application May 13, 1940, Serial No. 334,945
In Great Britain May 31, 1939

3 Claims. (Cl. 173—328)

My invention relates to improvements in means for connecting two members and locking them against unintentional separation. My invention is particularly suitable for connecting a container, e. g. a bottle, with its closure cap. Furthermore, it may be used in jewelry, e. g. for connecting the ends of a necklace to each other, instead of the customary clasps. It is also useful in electric joints as will be more fully explained hereinafter.

It is an object of my invention to provide a connecting means which is cheap to manufacture and easy to handle and yet will afford absolute safety against unintentional separation of the members.

According to my invention these objects are attained by providing one of the members with a dove-tailed projection, which has in its central portion of its inner surface a flange or a part flange or a projection; the other member being provided with a recess corresponding in shape to said dove-tailed projection and has in its central portion a recess into which said flange or part flange or projection fits so both members can be moved in a radial direction against each other. The arrangement of flange, part flange, projection-fitting recess can be in either member of this invention.

Other objects and features of my invention will be ascertained from the following detailed description and claims in connection with the drawing.

In the drawing accompanying this specification and forming part thereof one embodiment of my invention is diagrammatically illustrated by way of example.

In the drawing

Referring to Figs. 1 to 4, I and K are contact bearing members made from an insulating material such as ebonite. Member I is provided with a dove-tailed projection $I^1$ having the shape of an inverted truncated cone with flats $I^2$ and $I^3$ provided at opposite sides. The end surface $I^4$ of the projection is provided with a stud-like extension $I^5$ arranged in the centre thereof. At opposite sides of the extension $I^5$ contact pieces L are arranged on the end surface $I^4$ of the projection $I^1$ and secured in position by means of screws or rivets (not shown). Each contact piece L is connected to one of the wires M, respectively, which extend through suitable borings provided in the member I.

Figure 4:
Fig. 4 is a side elevation of a contact piece forming part of the device shown in Figs. 1 to 3.

Preferably each contact piece L is designed as a bent metal strip as shown in Fig. 4, the lower portion $L^1$ being secured to the member I and the upper portion $L^2$ being slightly curved so as to form a leaf spring constituting the contact piece proper. Each wire M is connected to the lower portion of its associated contact piece L by welding, soldering or the like.

Figure 2:
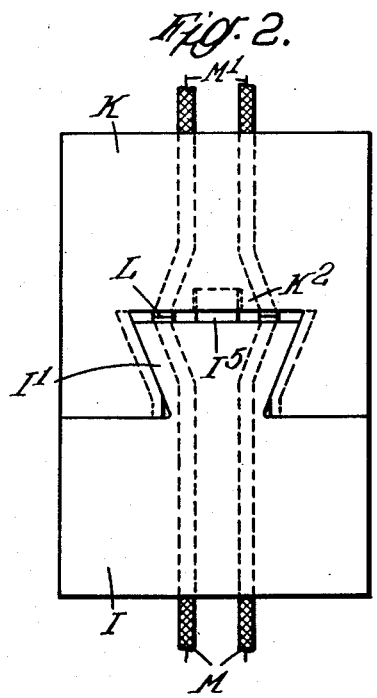
Fig. 2 is a side elevation of the device shown in Fig. 1, the members being in closing position.
Figure 3:
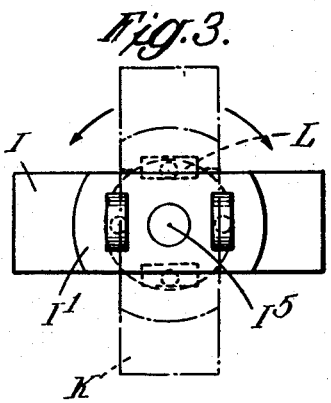
Fig. 3 is a plan view of the device shown in Figs. 1 and 2, the opening position of one of the members being indicated in dotted lines.

The other member K is provided with a recess $K^1$ the shape of which corresponds to that of the projection $I^1$. On the bottom surface of the recess two contact pieces L are fastened in the manner described above and arranged in such a manner that they will make contact with the two contact pieces on the projection $I^1$, respectively, when the members are brought into closing position as shown in Fig. 2. The contact pieces L arranged on the member K are connected to wires $M^1$, respectively, which extend through suitable borings of the member K. At the centre of the bottom surface of the recess $K^1$ a cylindrical recess $K^2$ is provided into which the extension $I^5$ fits, the recess $K^2$ having substantially the same diameter as the extension $I^5$.

Figure 1:
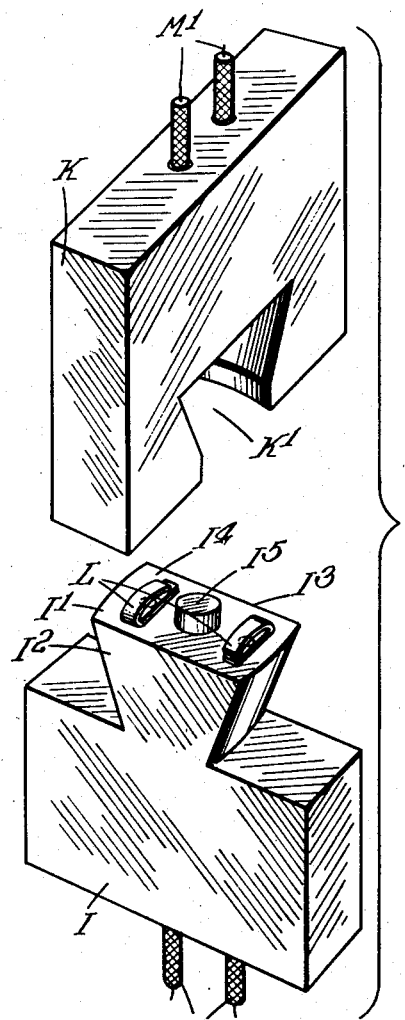
Fig. 1 is a perspective view of an embodiment of my invention designed as a device for connecting electrical appliances, here shown as two pairs of wires, the device being illustrated with its members in their relative position before closing.

The operation of this device is as follows:

In order to connect each wire M with one of the wires $M^1$, respectively, the members I and K are first brought into the relative position shown in Fig. 1 in which the projection $I^1$ can be introduced into the recess $K^1$ by a straight movement at the end of which the extension $I^5$ will engage the recess $K^2$. Then the members I and K are rotated relatively to each other so as to bring the contact pieces L into contact, the extension $I^5$ and the recess $K^2$ serving as a centering means during this operation. At the end of the rotary movement the side walls of the recess $K^1$ will come into contact with the curved side surfaces of the projection $I^1$ as will be seen from Figs. 2 and 3. It will be understood that owing to the shape of the projection and the recess the members I and K are locked in this position against unintentional separation. In order to interrupt the connection of the wires M and $M^1$ the members I and K are rotated once more so as to bring them into a relative position in which they include a right angle, in which position they can be easily withdrawn from each other. In an alternative embodiment of my invention the contact pieces L are designed as spring-loaded pins provided with slightly curved end surfaces forming convex contact faces, each pin being slidably arranged in a cylindrical boring of the contact carrying member from which its end slightly protrudes.

I wish it to be understood that the above specific embodiments of my invention are only given by way of example and that my invention is by no means limited to the details thereof.

I claim:

1. A connecting device comprising a member having a dove-tailed projection in the form of an inverted truncated cone having flats on opposite sides, a second member having a dove-tailed recess corresponding in shape and size to said projection, a projection having a cylindrical surface and arranged centrally on the end surface of said dove-tailed projection, said dove-tailed recess having a cylindrical recess provided centrally in the mid surface of said dove-tailed recess and corresponding in diameter to said cylindrical projection, said members being engageable by relative rotation when placed in axial alinement, and a pair of contact pieces arranged on one of said members having contact surfaces designed to exert a pressure in the axial direction of said members, whereby said members are retained in locked position with respect to each other.

2. A connection device comprising a member having a dove-tail projection in the form of a cone from which portions have been cut away at opposite sides to leave a flat-sided diametral conical section, and a second member having a flat-sided portion with a dove-tail recess therein complementary to said projection and rotatably engageable therewith, the conical wall of said recess intersecting the planes of the flat side to form opposed gaps in said wall of width providing clearance for the said conical section at its flat sides, axially operative spring means pressing the curved surfaces of the recess and conical section together, whereby said members are locked against axial separation in one position of relative rotation and are separable in a position of rotion transversely thereto.

3. A connection device comprising a block-shaped member having a dovetail projection in the form of a cone from which portions have been cut away on the opposite sides to leave a flat-sided diametral conical section, and a second block-shaped member having a flat-sided portion with a dovetail recess therein complementary to said projection and rotatably engageable therewith, the conical wall of said recess intersecting the planes of the flat side to form opposed gaps in said wall of width providing clearance for the said conical section at its flat sides, axially operative spring means pressing the curved surfaces of the recess and conical section together, whereby said members are locked in a position of relative rotation in which the two block members have their outer surfaces in mutual continuity and are separable in a position of rotation in which corresponding outer faces of the block members are transverse to each other.

JOHANNA ELLY SIMON,
NEE GRÜNEBAUM.